United States Patent
Matteucci

(10) Patent No.: US 8,695,467 B2
(45) Date of Patent: Apr. 15, 2014

(54) METHOD FOR CUTTING STRUCTURAL MEMBERS, SUCH AS LEGS, BEAMS, I-BEAMS OR THE LIKE FOR SUPPORTING STRUCTURES MADE OF STEEL, CONCRETE, STEEL AND CONCRETE, STONE-LIKE MATERIALS OR THE LIKE

(75) Inventor: Francesco Matteucci, Genoa (IT)

(73) Assignee: TS R&D S.R.L., Genoa (IT)

( * ) Notice: Subject to any disclaimer, the term of this patent is extended or adjusted under 35 U.S.C. 154(b) by 208 days.

(21) Appl. No.: 13/390,069

(22) PCT Filed: Aug. 3, 2010

(86) PCT No.: PCT/EP2010/061322
§ 371 (c)(1),
(2), (4) Date: Mar. 2, 2012

(87) PCT Pub. No.: WO2011/018395
PCT Pub. Date: Feb. 17, 2011

(65) Prior Publication Data
US 2012/0152071 A1    Jun. 21, 2012

(30) Foreign Application Priority Data
Aug. 13, 2009   (IT) ................................ GE2009A0065

(51) Int. Cl.
*B26D 3/10*   (2006.01)
*B26D 3/16*   (2006.01)

(52) U.S. Cl.
USPC ..................................... 83/39; 83/46; 83/796

(58) Field of Classification Search
USPC ......... 83/39, 46, 13, 788, 790, 796, 797, 809; 30/92.5
See application file for complete search history.

(56) References Cited

U.S. PATENT DOCUMENTS

| | | | | |
|---|---|---|---|---|
| 2,408,517 A * | 10/1946 | Howard | ........................ | 33/21.3 |
| 4,007,705 A * | 2/1977 | Sherer et al. | ................... | 118/710 |
| 4,091,514 A * | 5/1978 | Motes-Conners et al. | ..... | 29/33 T |
| 5,685,996 A * | 11/1997 | Ricci | ........................ | 219/121.39 |
| 6,267,037 B1 * | 7/2001 | McCoy et al. | ................... | 83/745 |
| 7,922,424 B2 * | 4/2011 | Clark, II | ........................ | 405/156 |
| 2005/0172765 A1 * | 8/2005 | Moore | ................................ | 83/13 |
| 2011/0314979 A1 * | 12/2011 | Bisso et al. | ........................ | 83/13 |

FOREIGN PATENT DOCUMENTS

| | | |
|---|---|---|
| EP | 0540834 B2 | 5/2004 |
| NL | 9 500 210 A | 9/1996 |
| WO | 00/78491 | 12/2000 |

OTHER PUBLICATIONS

PCT Search Report of International Application PCT/EP2010/061322 filed on Aug. 3, 2010 in the name of Francesco Matteucci.
PCT Written Opinion issued on Feb. 13, 2012 for International Application PCT/EP2010/061322 filed on Aug. 3, 2010 in the name of Francesco Matteucci.

* cited by examiner

*Primary Examiner* — Sean Michalski
(74) *Attorney, Agent, or Firm* — Steinfl & Bruno, LLP

(57) ABSTRACT

A method for cutting tubular members, particularly legs, for supporting structures using at least one travelling wire having suitable cutting parts is described.

9 Claims, 5 Drawing Sheets

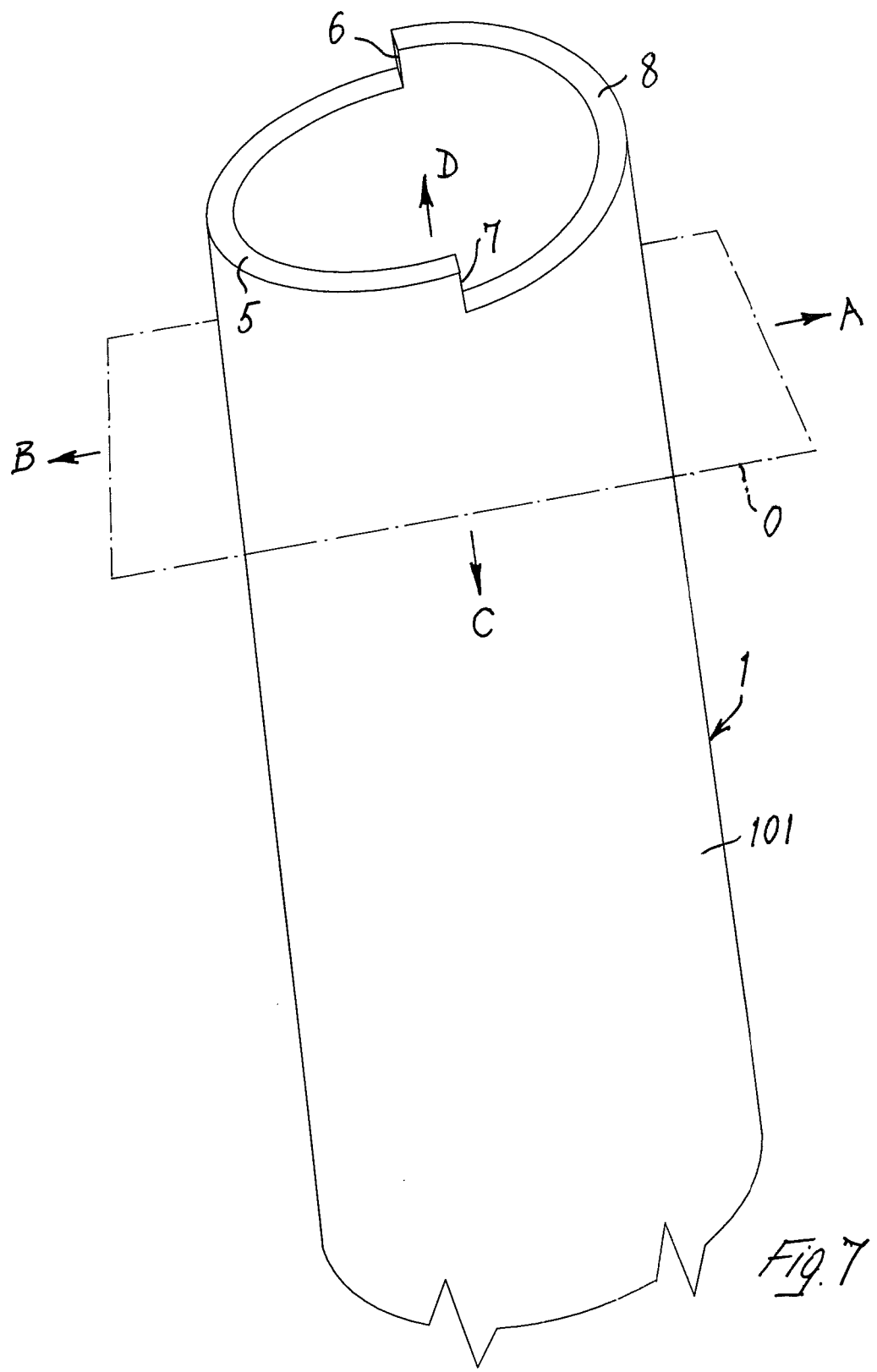

METHOD FOR CUTTING STRUCTURAL MEMBERS, SUCH AS LEGS, BEAMS, I-BEAMS OR THE LIKE FOR SUPPORTING STRUCTURES MADE OF STEEL, CONCRETE, STEEL AND CONCRETE, STONE-LIKE MATERIALS OR THE LIKE

CROSS REFERENCE TO RELATED APPLICATIONS

This present application is the US national stage of International Application PCT/EP2010/061322 filed on Aug. 3, 2010, which in turn claims priority to Italian Patent Application GE2009A000065 filed on Aug. 13, 2009.

DESCRIPTION

The present invention relates to a method for cutting structural members, such as legs, beams, I-beams or the like for supporting structures made of steel, concrete, steel and concrete, stone-like materials or the like.

As is known from the technical field of cutting up structures, including subsea structures, of the kinds indicated above, use is made of cutting machines fitted with wires containing suitable cutting parts, such as so-called diamond wires. One of these cutting machines is disclosed in patent EP 0540834 B2, belonging to the proprietor of the present application. That machine comprises a diamond wire running around a pair of pulleys positioned on slides able to move in an essentially horizontal direction along two suitable motion tracks. That machine, by means of the diamond wire, cuts the legs of for example a subsea structure in a single direction, generally horizontal and at right angles to the legs themselves.

As is also known, the supporting legs of a subsea structure, such as an oil platform standing on four legs fixed to the sea bed, must be cut one at a time. The cutting machine is therefore positioned appropriately on a first leg, and once it has cut the first leg it is transferred to another leg, and so on until it has cut all the legs of the structure at a certain height or depth. This leg cutting operation is very lengthy and must be carried out with the utmost safety and efficiency.

As mentioned above, each of the legs is cut in an essentially horizontal direction and therefore at right angles to the leg itself. This cut causes problems, because at the end of the cut the bottom part of each leg is still fixed to the sea bed while the top part is still connected to the supported structure but is disconnected and simply resting on the fixed bottom part. It could therefore slide against the latter, which would be highly undesirable. This risk of the top part of the leg sliding relative to the fixed bottom part is absolutely to be avoided as it could create serious problems of stability in the leg cutting operations, each of which legs, once cut, must be sufficiently stable, even with the top part simply resting on the bottom part fixed to the sea bed, to allow the remaining legs to be cut.

The object of the present invention is therefore to provide a method for cutting structural members, such as legs, beams, I-beams or the like for supporting structures made of steel, concrete, steel and concrete, stone-like materials or the like, which makes it possible to complete, in particular, the cutting of the legs of a subsea structure safely and efficiently, ensuring that each cut leg has sufficient stability to allow the remaining legs to be cut within the required time limits, and ensuring above all that the top part of the cut leg cannot slide or make any other horizontal movement relative to the bottom part, fixed to the sea bed, on which this top part simply rests when the cut is completed.

This object is achieved by the present invention with a method for cutting structural members, such as legs, beams, I-beams or the like for supporting structures made of steel, concrete, steel and concrete, stone-like materials or the like, using at least one travelling wire having suitable cutting parts, which method is characterized by the following stages:

a) first cut in a transverse direction relative to the tubular member, extending to a certain depth into said member, in such a way as to produce a first cut line in the form of an arc of a circle;

b) second cut in a longitudinal direction relative to said tubular member, extending to a certain height of said member, in such a way as to produce two steps at two diametrically opposite points of said tubular member; and c) third cut in a transverse direction relative to the tubular member until the travelling wire emerges from said tubular member, in such a way as to produce a second cut line in the form of an arc of a circle.

Another problem that arises when cutting structural members, especially suspended structural members, is that when these members are cut the bottom section inevitably drops to the ground. These suspended structural members are attached to a supporting structure at the top end but their bottom end is free.

It is therefore another object of the present invention to provide a cutting method that will allow the bottom section cut from the suspended structural member to be still engaged, even though cut, on the top section attached to the supporting upper structure and enable it to be detached from this top section only by sliding in an essentially horizontal direction.

This other object of the present invention is achieved by a method for cutting structural members, such as legs, beams, I-beams or the like for supporting structures made of steel, concrete, steel and concrete, stone-like materials or the like, using at least one travelling wire having suitable cutting parts, which method is characterized by the following stages:

a) first cut in an approximately horizontal plane in a first transverse direction relative to the structural member, extending to a certain depth into said member, in such a way as to produce a first cut line in the form of an arc of a circle;

b) second cut in an approximately longitudinal direction relative to said structural member, extending to a certain height of said member, in such a way as to produce a first stepped cut line;

c) third cut in an approximately horizontal plane in a second transverse direction relative to the structural member, extending to a certain depth into said member, in such a way as to produce a second cut line in the form of an arc of a circle, said second direction being opposite said first direction;

d) fourth cut in an approximately longitudinal direction relative to said structural member, extending to a certain height of said member, in such a way as to produce a second stepped cut line; and e) fifth cut in an approximately horizontal plane in said transverse direction relative to the structural member, until the travelling wire emerges from said structural member, in such a way as to produce a third cut line in the form of an arc of a circle.

Other features and advantages of the present invention will be understood more clearly from the following description, considered by way of example, without implying any limitation, which refers to the appended drawings, in which:

FIG. 7 is a partial perspective view of the bottom part of the tubular member on completion of the cut by the present method;

Figure 1:
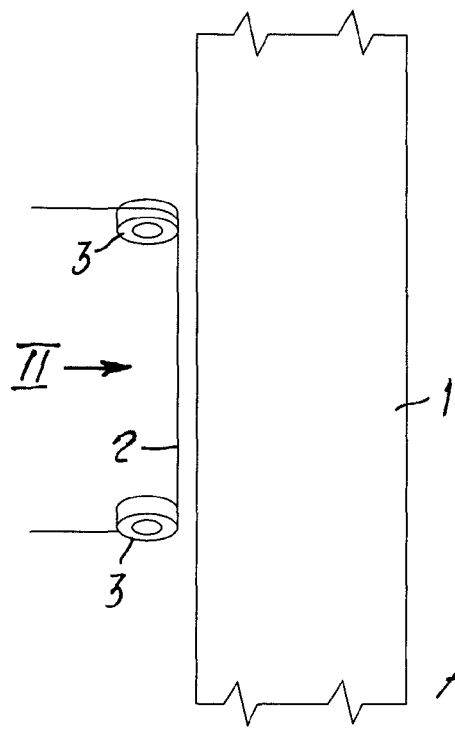
FIG. 1 is a partial side view of a vertical tubular member, e.g. a supporting leg of a structure, and next to it a diamond wire capable of cutting through it.
Figure 3:
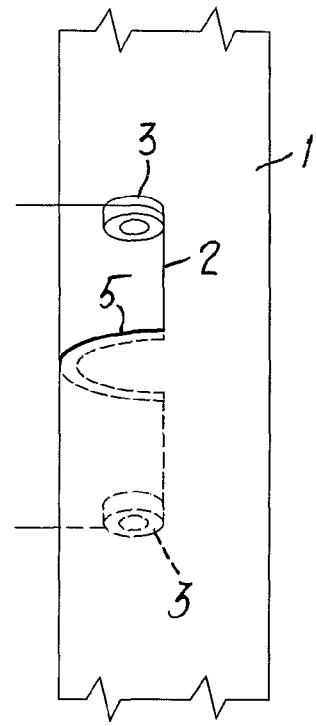
FIG. 3 is a side view of the tubular member seen in FIG. 1 in which the diamond wire has made a first cut.

Referring to these appended drawings, particularly FIG. 1, reference 1 denotes a tubular member that must be cut into two parts by the present cutting method. This tubular member, as mentioned earlier, may be a supporting leg of a subsea structure, such as an oil platform or the like. To make this cut by the present method, a travelling wire 2 with suitable cutting parts or inserts, such as a diamond wire, known per se, running around a pair of pulleys 3, is used.

Figure 2:
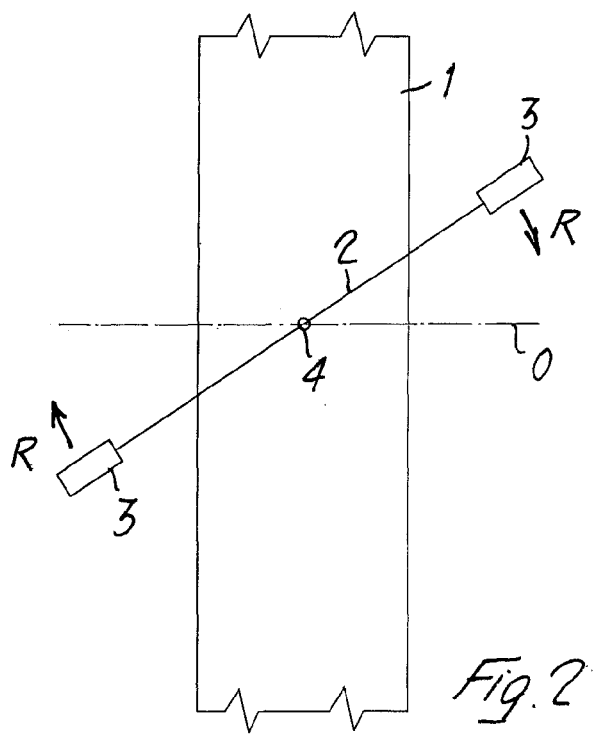
FIG. 2 is a view in direction II as marked in FIG. 1 of the tubular member, and next to it the diamond wire inclined at a certain angle.

FIG. 2 shows the travelling wire 2 positioned with a certain inclination with respect to a general horizontal plane O. To achieve this inclination the travelling cutting wire 2 is rotated through a certain angle about its centre 4 of symmetry.

From the position of FIG. 2, the travelling wire 2 is moved translationally towards the tubular member and performs a first cut 5 in the form of an arc of a circle. This first cut reaches preferably halfway through the tubular member 1.

Figure 4:
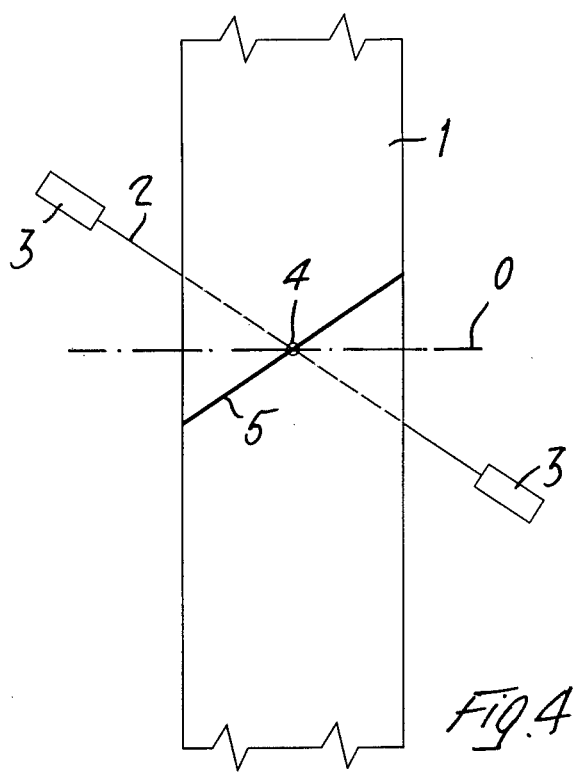
FIG. 4 is a view of the tubular member similar to the view in FIG. 2, in which the diamond wire has been rotated to a symmetrical position with respect to the position shown in FIG. 2.

At this point (see FIG. 2 again), the travelling wire 2 is rotated about its own centre 4 of symmetry in the direction of the arrows R until it reaches the position shown in FIG. 4, which is symmetrical with respect to the position in FIG. 2 and to the horizontal line O. During this rotation in the direction of the arrows R, the wire 2 makes two diametrically opposite longitudinal cuts on the surface of the tubular member 1, forming two diametrically opposite steps 6 and 7 of equal height thereon: see FIGS. 5 and 7 for this.

Figure 5:
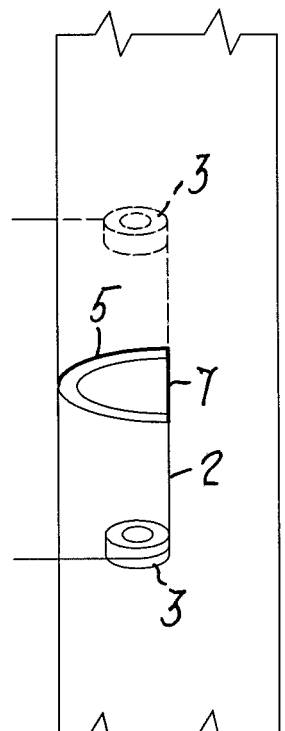
FIG. 5 is a side view of the tubular member in which the diamond wire, following the rotation illustrated in FIG. 4, has made a second cut.
Figure 6:
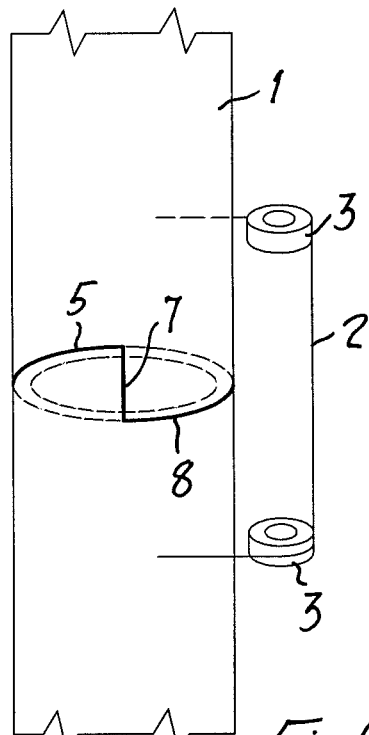
FIG. 6 is a side view of the tubular member in which the diamond wire has made a further cut and has passed completely through this tubular member.

From the position shown in FIGS. 4 and 5, the travelling wire 2 is again moved translationally in such a way as to emerge from the tubular member 1 on the opposite side from that on which it entered in FIG. 1. By means of this last translational movement the travelling wire 2 makes a further transverse cut 8 in the form of an arc of a circle having the same depth as the first cut line 5.

FIG. 7 shows the bottom part 101 of the tubular member 1 at the end of the present cutting method described above. This bottom part 101 of the tubular member could be the bottom part of a supporting leg of a subsea structure fixed to the sea bed. The two diametrically opposite steps 6 and 7, of equal height, demarcate the two transverse cut lines 5 and 8: the first cut line 5 is inclined and its height increases continuously from the base of the first step 6 to the top of the second step 7, while the second cut line 8 is inclined and its height decreases continuously from the top of the first step 6 to the base of the second step 7.

Above this bottom part 101 of the tubular member 1 following the cut, the top part of the tubular member will still be present (not shown), its bottom edge being exactly complementary to that of the cut lines 5 and 8 and steps 6 and 7. This top part of the tubular member 1, even if detached from the bottom part 101 following the cut, is prevented, by the present method, from making any sliding or translational movement in a general horizontal plane O because: the steps 6 and 7 prevent any sliding movement of this top part relative to the bottom part 101 of the tubular member 1 in directions A and B, respectively, while the inclined cut lines 5 and 8 prevent any sliding movement of this top part relative to the bottom part 101 in directions C and D, respectively.

Figure 8C:
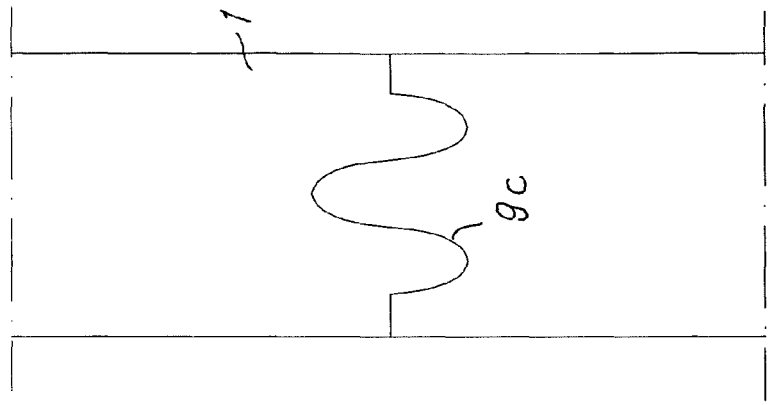
FIGS. 8a-8c show other examples of the cut lines obtainable by the present method.
Figure 8B:
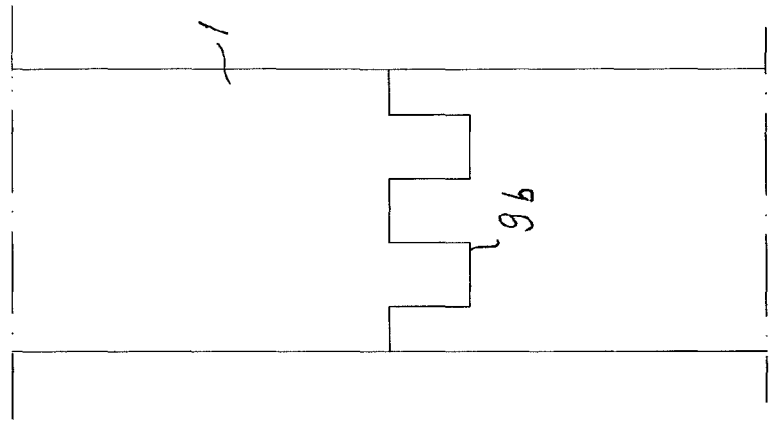
Figure 8A:
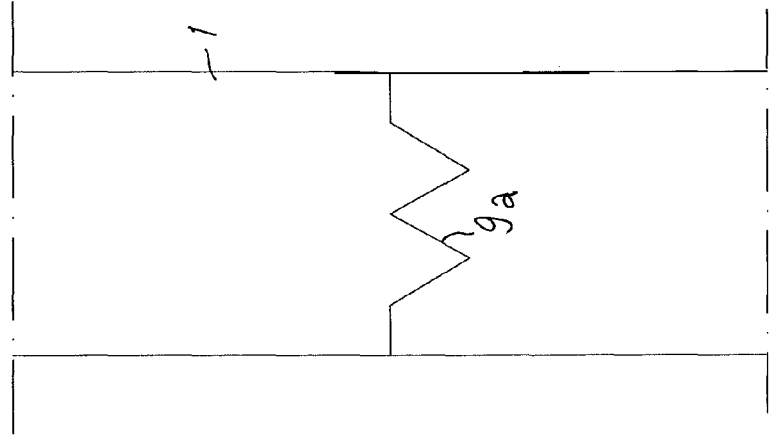

By repeating the stages described above of the present method before the travelling wire exits the tubular member, it is also possible to produce cut lines 9a and 9b which are sawtoothed—see FIGS. 8a and 8b, or cut lines 9c of sinusoidal form —see FIG. 8c, or the like.

Figure 9:
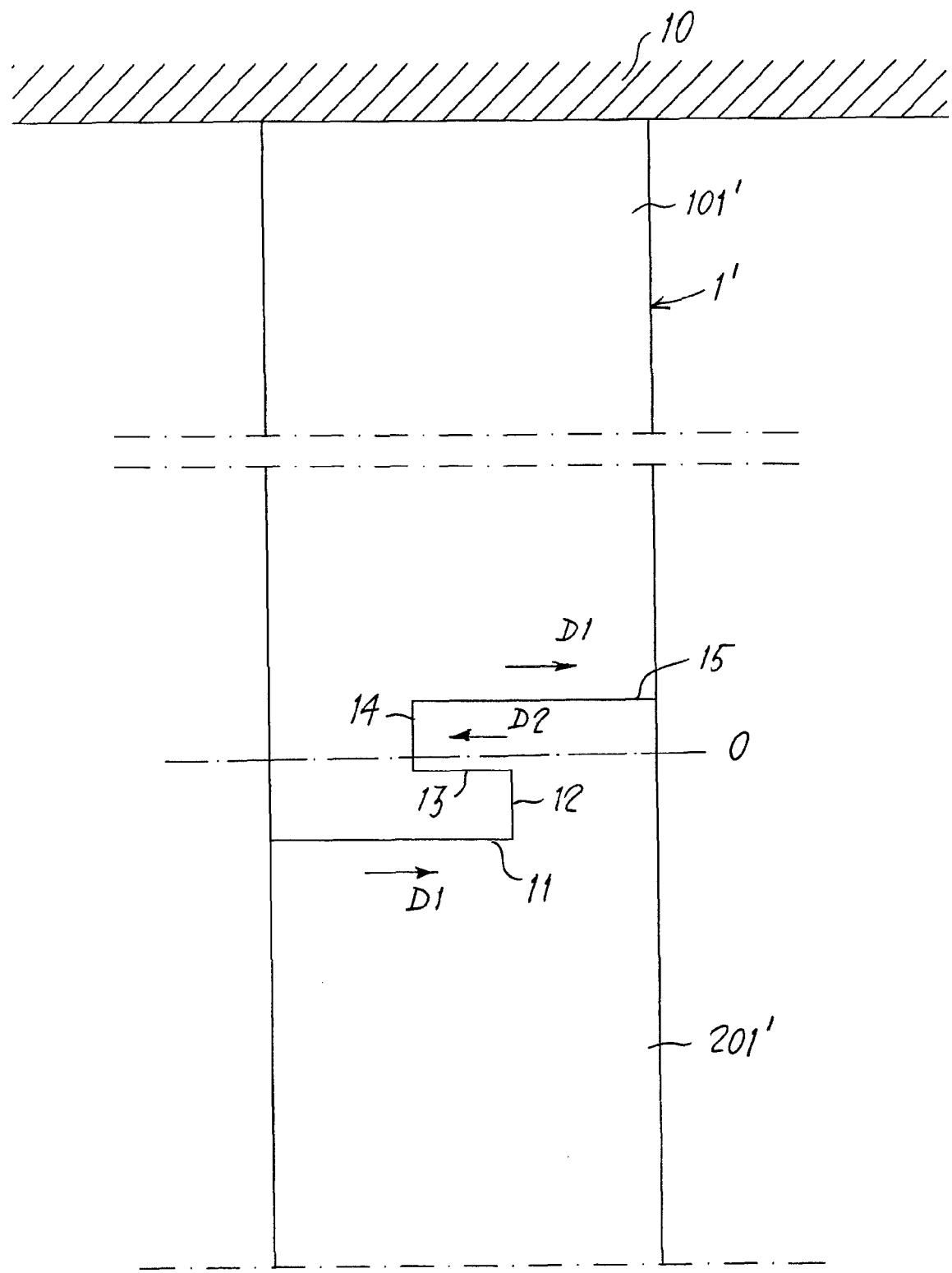
FIG. 9 is a side view of a suspended structural member cut by the present cutting method.

FIG. 9 shows a suspended tubular member 1'—that is, it is fixed at the top end to a supporting structure 10 while its bottom end is free. This tubular member 1' is divided, by the present cutting method, into two parts: a first part 101' which stays anchored to the supporting structure 10 and a second part 201' which, despite having been separated from this first part 101' by the cut performed by the diamond wire 2 seen in the previous figures is still engaged on it. To make a cut line like that shown in the figure, a first cut must be made in a general horizontal plane O and in a certain first direction D1 in order to produce a first cut line 11 in the form of an essentially horizontal arc of a circle. Next, a second stepped cut line 12 is produced in a direction perpendicular to said plane O, that is vertically, e.g. upwards; a second cut line 13 in the form of an arc of a circle is thus made in a second direction D2 which is the opposite of said first direction D1 and again in a horizontal plane O. The stepped cut line 14 is essentially vertical and is produced at the end of the third cut in direction D2. Finally the diamond wire 2 is brought out of the tubular member by a fifth cut which again lies in an essentially horizontal plane O and is again made in the direction D1, to produce a third cut line 15 in the form of an arc of a circle. By this process, advantageously, producing the total cut line 11-15 in the tubular member 1', no vertical movement is possible of the cut part 201' with respect to the part 101' which remains attached to the supporting structure 10. This cut part 201' with the total cut line 11-15 can only be separated from this attached part 101' by sliding it in an essentially horizontal direction.

Using the present method of cutting tubular members, therefore, it is possible to cut, for example, supporting legs of subsea structures with the utmost safety and within the times required for cutting each leg, without running the risk of compromising the stability of the structure and the success of the operation, and ensuring that each leg, once cut, has good stability and that its top and bottom parts do not move accidentally. An example of a machine capable of carrying out the present cutting method is the subject of a simultaneous application belonging to the owners of the present application.

In the case of horizontal or slightly inclined structural members, such as beams or the like, a cutting method of the utmost safety can be carried out by performing: a first cutting stage in an essentially vertical direction transverse with respect to the structural member; a second essentially horizontal cutting stage longitudinal with respect to the structural member in a middle area of the structural member; and a third cutting stage, again in an essentially vertical direction, to allow the diamond wire to emerge from the cut member. The end result of these three cutting stages is an essentially stepped cut line and, as will be readily understood, by making for example two cuts of this kind in a horizontal structural member attached at both ends and suspended at a certain height from the ground, the intermediate part between the two resulting cut steps will be prevented from making any vertical movement and therefore will not fall to the ground. In other words, this intermediate part will remain engaged between the parts of the structural member which are attached at the ends and can only be extracted by an essentially horizontal movement.

The invention claimed is:

1. A method for cutting a structural member using a cutting means acting on a cutting plane and moving along a cutting direction, the method comprising:
    cutting a first cutting path by positioning the cutting means at a first inclination angle with respect to a longitudinal axis of the structural member and moving the cutting means along the cutting direction parallel to the cutting plane to a set depth of the structural member;
    cutting a second cutting path by changing the first inclination angle of the cutting plane at least once to a second inclination angle and moving the cutting means along the cutting direction, thus cutting at least half of an entire width of the structural member; and
    cutting a third cutting path by changing the cutting plane of the cutting means to a third inclination angle with respect to the longitudinal axis of the structural member and moving the cutting means along the cutting direction, thus completely cutting through the structural member.

2. The method according to claim 1, wherein the cutting means is a closed loop travelling cutting wire.

3. The method according to claim 1, wherein the second inclination angle is an angle parallel to the longitudinal axis of the structural member, such that the second cutting path produces two cuts at two diametrically opposite sections of the structural member.

4. The method according to claim 3, wherein the two cuts have equal heights.

5. The method according to claim 1, wherein the first cutting path and the second cutting path have substantially same depths.

6. The method according to claim 1, wherein which the first inclination angle is substantially perpendicular to the longitudinal axis of the structural member.

7. The method according to claim 1, wherein the third inclination angle is substantially perpendicular to the longitudinal axis of the structural member.

8. The method according to claim 1, wherein the changing the first inclination angle of the cutting plane at least once is changing the first inclination angle of the cutting plane a plurality of times, thus obtaining a substantially sawtooth or a substantially sinusoidal cutting pattern.

9. The method according to claim 1, wherein the structural member supports structures made of steel, concrete, or stone-like materials, the structural members being selected from the group consisting of: legs, beams and I-beams.

* * * * *

UNITED STATES PATENT AND TRADEMARK OFFICE
CERTIFICATE OF CORRECTION

PATENT NO. : 8,695,467 B2  
APPLICATION NO. : 13/390069  
DATED : April 15, 2014  
INVENTOR(S) : Francesco Matteucci Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 227 days.

Signed and Sealed this

Twenty-ninth Day of September, 2015

Michelle K. Lee
*Director of the United States Patent and Trademark Office*